(12) United States Patent
Levisse et al.

(10) Patent No.: US 11,415,045 B2
(45) Date of Patent: Aug. 16, 2022

(54) AIRCRAFT TURBOMACHINE WITH MECHANICAL REDUCER AND CONTRAROTATIVE TURBINE

(71) Applicant: SAFRAN AIRCRAFT ENGINES, Paris (FR)

(72) Inventors: Paul Ghislain Albert Levisse, Moissy-Cramayel (FR); Olivier Belmonte, Moissy-Cramayel (FR); Olivier Formica, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 95 days.

(21) Appl. No.: 16/597,505

(22) Filed: Oct. 9, 2019

(65) Prior Publication Data
US 2020/0116081 A1 Apr. 16, 2020

(30) Foreign Application Priority Data

Oct. 10, 2018 (FR) ...................................... 1859406

(51) Int. Cl.
*F02C 3/067* (2006.01)
*F02C 7/06* (2006.01)
(Continued)

(52) U.S. Cl.
CPC .............. *F02C 3/067* (2013.01); *F01D 25/16* (2013.01); *F02C 7/06* (2013.01); *F02C 7/36* (2013.01);
(Continued)

(58) Field of Classification Search
CPC .... F01D 25/16; F02C 7/06; F02C 7/36; F02C 3/067; F05D 2240/50; F05D 2250/44;
(Continued)

(56) References Cited

U.S. PATENT DOCUMENTS

| 4,916,894 A | 4/1990 | Adamson et al. |
| 5,010,729 A | 4/1991 | Adamson et al. |

(Continued)

FOREIGN PATENT DOCUMENTS

| FR | 2 641 331 A1 | 7/1990 |
| FR | 2 641 333 A1 | 7/1990 |
| FR | 2 942 273 A1 | 8/2010 |

OTHER PUBLICATIONS

French Search Report and Written Opinion dated Jun. 3, 2019, issued in corresponding French Application No. 1859406, filed Oct. 10, 2018, 8 pages.

*Primary Examiner* — J. Todd Newton, Esq.
*Assistant Examiner* — Jesse M Prager
(74) *Attorney, Agent, or Firm* — Christensen O'Connor Johnson Kindness PLLC

(57) ABSTRACT

Aircraft turbomachine with mechanical reducer and counter-rotating turbine are described. The turbomachine includes a fan driven in rotation by a fan shaft, a mechanical reducer with epicyclic gear train, a gas generator comprising a counter-rotating turbine, a first turbine shaft of which is coupled to an input shaft of the reducer and to a pin, and a second turbine shaft of which is coupled to the fan shaft. The guidance of the reducer input shaft is provided by a first ball bearing, the guidance of the pin is provided by a second roller bearing, and the guidance of the first shaft is provided by a third roller bearing axially interposed between the first and second bearings.

10 Claims, 6 Drawing Sheets

(51) Int. Cl.
*F02C 7/36* (2006.01)
*F01D 25/16* (2006.01)

(52) U.S. Cl.
CPC .... *F05D 2220/323* (2013.01); *F05D 2230/60* (2013.01); *F05D 2240/50* (2013.01); *F05D 2250/44* (2013.01); *F05D 2260/40311* (2013.01)

(58) Field of Classification Search
CPC .......... F05D 2220/323; F05D 2230/60; F05D 2260/40311; F02K 3/06
See application file for complete search history.

(56) References Cited

U.S. PATENT DOCUMENTS

| | | | |
|---|---|---|---|
| 8,667,777 B2 | 3/2014 | Gallet | |
| 2006/0093468 A1* | 5/2006 | Orlando | F01D 1/26 415/68 |
| 2008/0098715 A1* | 5/2008 | Orlando | F02C 7/36 60/226.1 |
| 2011/0206498 A1* | 8/2011 | McCooey | F16H 57/082 415/124.1 |
| 2012/0090329 A1* | 4/2012 | McCune | F01D 21/04 60/772 |
| 2012/0257960 A1* | 10/2012 | Reinhardt | F01D 25/162 415/122.1 |
| 2015/0143794 A1* | 5/2015 | Schwarz | F02K 3/04 60/226.1 |
| 2016/0025003 A1* | 1/2016 | Schwarz | F02C 3/107 415/69 |
| 2016/0298639 A1* | 10/2016 | Brault | F02C 7/06 |
| 2018/0100435 A1* | 4/2018 | Moniz | F01D 25/16 |
| 2018/0334907 A1* | 11/2018 | Perrier | F04D 29/20 |

* cited by examiner

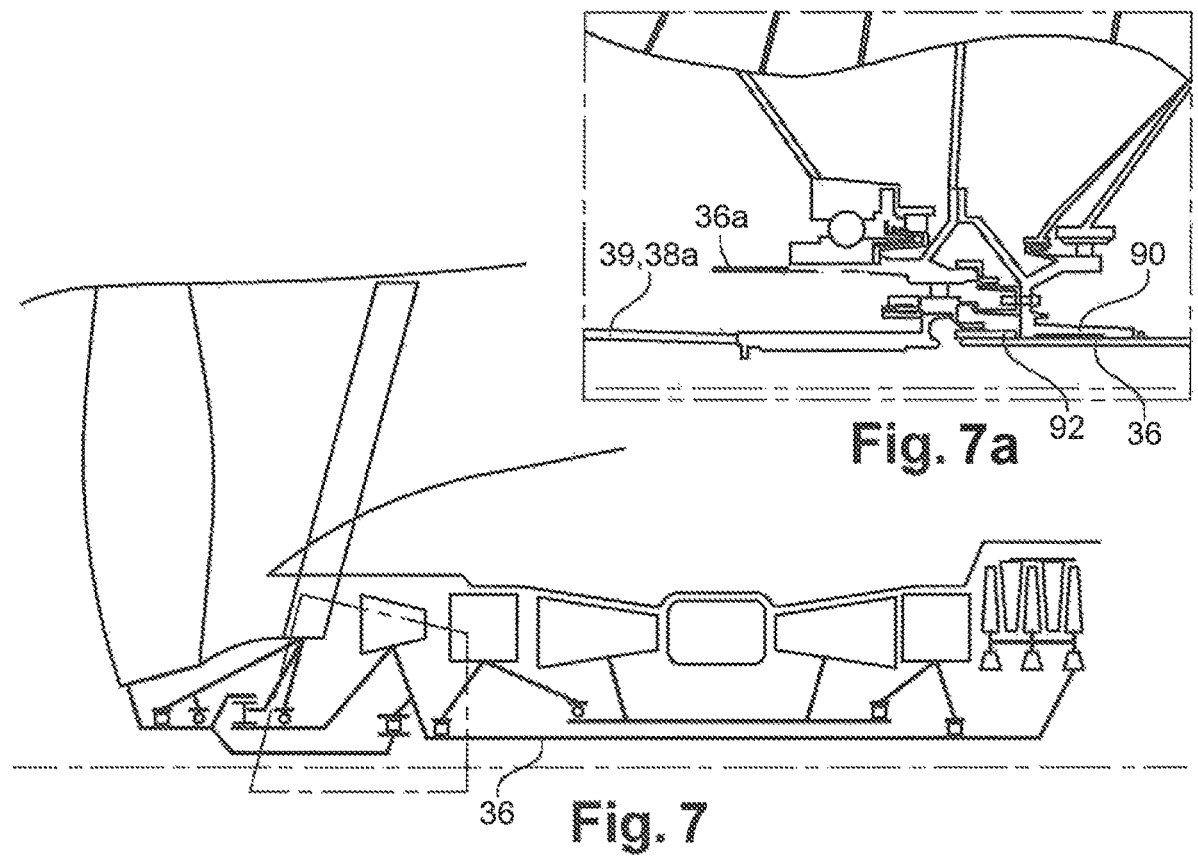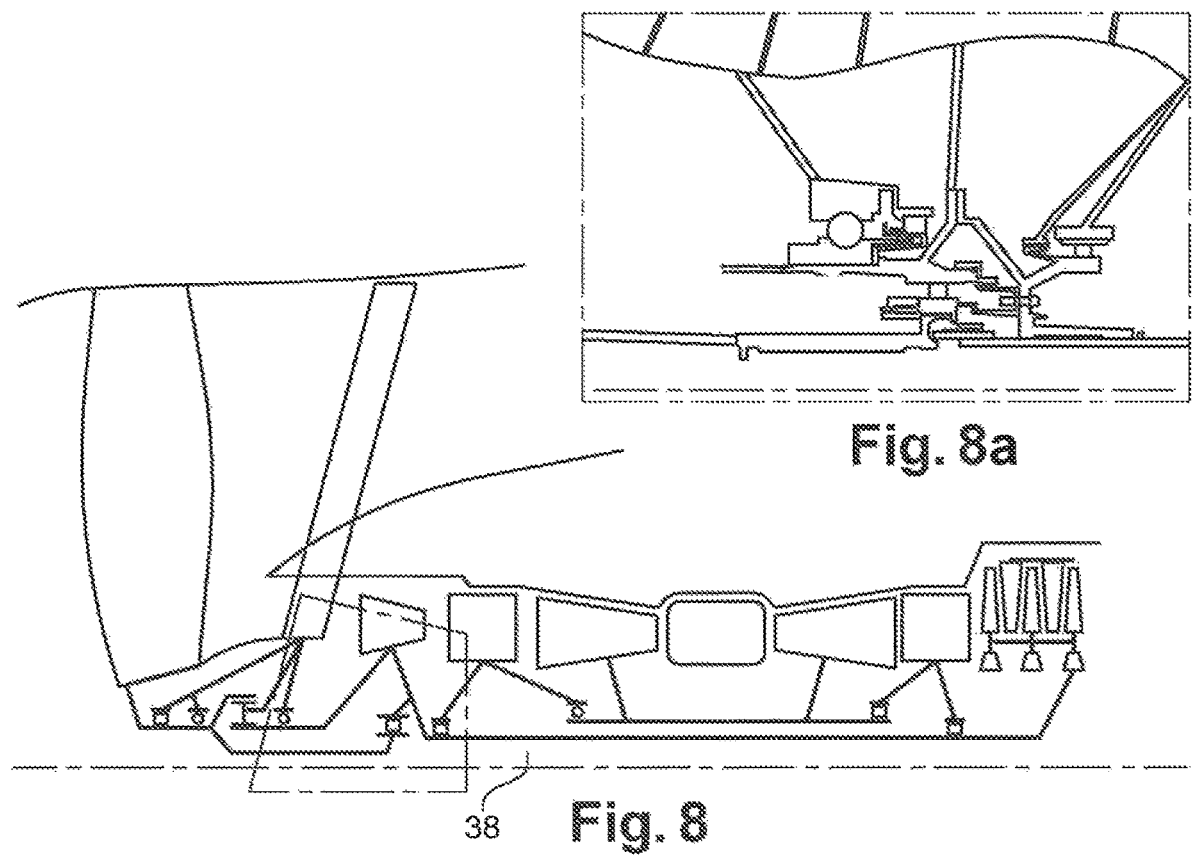

AIRCRAFT TURBOMACHINE WITH MECHANICAL REDUCER AND CONTRAROTATIVE TURBINE

TECHNICAL FIELD

The present disclosure relates to a counter-rotating turbine turbomachine for an aircraft.

BACKGROUND

The prior art includes documents FR-A1-2 942 273, FR-A1-2 641 331 and FR-A1-2 641 333.

Typically, an aircraft turbomachine includes, from upstream to downstream, in the direction of the flow of gases, a fan, a low-pressure compressor, a high-pressure compressor, an annular combustion chamber, a high-pressure turbine, and a low-pressure turbine. The low-pressure compressor rotor is driven by the low-pressure turbine rotor, and the high-pressure compressor rotor is driven by the high-pressure turbine rotor.

From the point of view of engine performance and fuel consumption, it is advantageous to maximize the rotational speed of the low-pressure turbine because this achieves better turbine efficiency. However, increasing the rotational speed of the turbine implies increasing the centrifugal forces it undergoes, and therefore greatly complicates its design.

One suggestion to increase the turbine's efficiency without increasing its speed is to equip the turbomachine with a counter-rotating turbine, as described in the document FR-A1-2 942 273. The low-pressure turbine is then replaced by a two-rotor turbine, a first rotor configured to rotate in a first direction of rotation and connected to a first turbine shaft, and a second rotor is configured to rotate in an opposite direction of rotation and is connected to a second turbine shaft. The first rotor has wheels interposed between wheels of the second rotor.

A low-pressure turbine can have a maximum rotational speed of 4,000 rpm in a conventional architecture where the turbine drives the fan directly at 10,000 rpm in an architecture where the turbine drives the fan through a reducer. Its replacement by a counter-rotating turbine, the rotors of which rotate at maximum speeds of 3,000 and 7,000 rpm respectively allows a relative speed of 10,000 rpm (3000+7000) while having an absolute speed in a low range of the above-mentioned speed range.

This counter-rotating turbine thus includes a slow rotor and a fast rotor, the slow rotor driving the fan and the fast rotor driving the low-pressure compressor and meshing with a mechanical reducer with an epicyclic gear train.

The reducer connects the fast rotor and the slow rotor, allowing power to be transferred from the fast rotor to the slow rotor. This allows the benefits of a fast low-pressure compressor to be enjoyed, while providing energy to the fan.

This architecture is complex due to its mechanical integration: the mechanical reducer is located upstream of the low-pressure compressor.

In the prior art, this positioning of the reducer involves placing many bearings and oil recovery enclosures inside the low-pressure compressor. In addition, the two shafts of the counter-rotating turbine extend along and inside the engine, from downstream of the turbomachine where the counter-rotating turbine is located, to upstream of the turbomachine where the reducer is located. These shafts pass through very restricted areas. Finally, the assembly and disassembly of such an engine is particularly complex.

SUMMARY OF THE DISCLOSURE

This disclosure provides a simple, effective and economical solution to at least some of the problems mentioned above.

According to a first aspect, the disclosure concerns a system for fixing a shaft of a counter-rotating turbine for an aircraft turbomachine. The system includes a first turbine shaft substantially tubular and extending along and about an axis X. The first turbine shaft includes, at a free end, called the upstream end with reference to the flow of gases in the turbomachine, an upstream screwing portion with an outer thread, and a downstream coupling portion. In an embodiment, the system includes a compressor pin mounted on the free upstream end of the first turbine shaft and configured to cooperate with the coupling portion to be rotationally integral with the first turbine shaft. In an embodiment, the system also includes a nut for blocking the pin on the first turbine shaft, the nut comprising an upstream gripping section configured to be engaged with a nut screwing/unscrewing tool, and an intermediate screwing section with inner thread configured to cooperate with the upstream section. The nut is configured to support axially on the pin when in a screwed and tightened position, and to be retained radially by pressing on the pin and/or the first turbine shaft when in a fully unscrewed position.

The disclosure provides for the assembly and disassembly of a turbomachine with counter-rotating turbine. The nut facilitates this assembly and disassembly. It can cooperate with surrounding parts to trap it in a cavity during an assembly/disassembly phase which can often be carried out blindly. The nut preferably remains trapped in the cavity until the first shaft is removed. Its arrangement allows two coaxial shafts with very similar diameters while allowing disassembly by functional sub-assemblies.

Embodiments of the system may include one or more of the following characteristics, taken in isolation from each other or in combination with each other. For example, the system may include at least one member among the nut and the first shaft including a retaining portion or section capable of cooperating with the other member to ensure the radial retention of the nut in the unscrewed position. In an aspect, the pin is integral in rotation with an input shaft of a mechanical reducer with an epicyclic gear train. A second turbine shaft may extend coaxially inside the first shaft and includes at its upstream end a coupling portion with a fan shaft. In an aspect, at least one bearing is mounted between the pin, the input shaft, or both, on the one side, and the fan shaft, on the other side. In an aspect, the pin comprises a cylindrical wall which is complementary to the coupling portion, and a radial wall of the pin which includes or carries a first downstream oriented cylindrical edge and delimiting an annular space configured to receive oil from at least one nozzle. In an aspect, the radial wall has a series of orifices passing through the bottom of this space to allow oil to pass from the downstream to the upstream of the radial wall, within a lubrication enclosure of at least one bearing.

In an aspect, the nut comprises outer annular lips of a first labyrinth seal. The first seal ensures a sealing of the enclosure wherein the at least one bearing is located. The radial wall comprises or carries a second upstream oriented cylindrical edge and delimiting an annular space configured to receive oil exiting from the orifices and to supply this oil axially upstream. The at least one bearing comprises an inner ring comprising or carrying a third downstream oriented cylindrical edge surrounding at least part of the second edge, and delimiting an annular space configured to receive oil supplied by the second edge. The inner ring comprising channels for circulating this oil to rolling elements of the at least one bearing.

In an aspect, the radial wall comprises or carries a third upstream oriented cylindrical edge comprising outer annular lips of a second labyrinth seal. These lips may cooperate with a layer of abradable material carried by an outer ring of the at least one bearing.

The present disclosure also describes an aircraft turbomachine, comprising a system as described above.

According to another aspect, the disclosure concerns an aircraft turbomachine with mechanical reducer and counter-rotating turbine. In an embodiment, the turbomachine includes a fan driven in rotation by a fan shaft, a mechanical reducer with an epicyclic gear train, a gas generator comprising a counter-rotating turbine, a first turbine shaft of which is coupled to the fan shaft and to an output shaft of the reducer, a second turbine shaft of which is coupled to an input shaft of the reducer and to a pin of a low-pressure compressor of the gas generator. The guidance of the input shaft of the reducer is provided by a first ball bearing located downstream of the reducer, between this input shaft and an input casing. The guidance of the pin is provided by a second roller bearing mounted between this pin and an intermediate casing of the turbomachine. The guidance of the first shaft is provided at least by a third roller bearing axially interposed between the first and second bearings and located between the first shaft and the input shaft.

The disclosure thus offers an optimal arrangement of the bearings in a turbomachine with counter-rotating turbine and reducer.

The turbomachine according to the disclosure may include one or more of the following characteristics, taken in isolation from each other or in combination with each other. In an aspect, the guidance of the fan shaft and output shaft may be provided by an upstream roller bearing (fourth bearing) and a downstream ball bearing (fifth bearing). These bearings may be located upstream of the reducer between the fan and output shafts on the one hand and the input casing on the other. In an embodiment, the first bearing may have an average diameter greater than the average diameter of the second bearing, which is itself greater than the average diameter of the third bearing. The pin may be engaged on the first shaft and axially fixed on it by a first nut screwed on the first shaft. In an embodiment, the fan shaft and the output shaft may be axially fixed on the second shaft by a second nut screwed on the second shaft. In an aspect, the first shaft may be connected at its downstream end to a first turbine rotor, and the second shaft may be connected at its downstream end to a second turbine rotor. The first turbine rotor may include wheels interposed between wheels of the second turbine rotor. In an aspect, the first and second turbine rotors may be surrounded by a casing, a downstream end of which includes a flange for fixing to an exhaust casing of the turbomachine.

The disclosure also concerns a method of disassembling a turbomachine as described above. In an embodiment, the method may include disassembling and removing an inlet cone of the turbomachine, located upstream and in the center of the fan. The method may also include unscrewing the second nut by means of a tool inserted into the second shaft from the upstream end of the turbomachine. The method may include disassembling the second shaft and removing the second shaft from downstream of the turbomachine. The method may include unscrewing the first nut by means of a tool inserted into the first shaft from the upstream end of the turbomachine. The method may also include disassembling the first shaft and removing the first shaft from downstream of the turbomachine. In some embodiments, disassembling the second shaft may include disassembling and removing the exhaust casing, then disassembling and removing at least a part of the second rotor, and of the second shaft, removing at least a part of the second rotor and of the second shaft being performed simultaneously or successively. In some embodiments, disassembling the first shaft may include disassembling and removing at least a part of the first rotor and of the first shaft, removing at least a part of the first rotor and of the first shaft being performed simultaneously or successively.

The first nut can be mounted on the first shaft and may remain on the first shaft after unscrewing it.

In addition, it is also described a system for fixing a shaft of a counter-rotating turbine for an aircraft turbomachine. A first substantially tubular turbine shaft may extend along and about an axis X. The first turbine shaft may include, at a free end, called the upstream end with reference to the flow of gases in the turbomachine, an upstream screwing portion with an outer thread, and a downstream coupling portion. A compressor pin may be integral in rotation with an input shaft of a mechanical reducer with an epicyclic gear train, which is mounted on the free upstream end of the first turbine shaft and is configured to cooperate with the coupling portion to be rotationally integral to the first turbine shaft. The system may include a nut a nut for blocking the pin on the first turbine shaft. The nut may include an upstream gripping section configured to be engaged with a screwing/unscrewing tool of the nut, and an intermediate screwing section with inner thread configured to cooperate with the upstream section.

The nut may be configured to support axially on the pin when in a screwed and tightened position, and to be retained radially by pressing on the pin and/or the first turbine shaft, at a retaining portion or section of the nut or first shaft, when in a fully unscrewed position.

In addition, this fixing system may include one or more of the following characteristics, taken in isolation from or in combination with each other. In an aspect, a second turbine shaft may extend coaxially inside the first shaft and includes at its upstream end a coupling portion with a fan shaft. In an aspect, the at least one bearing may be mounted between the pin and/or input shaft, on the one hand, and the fan shaft, on the other hand. In an aspect, the nut may include outer annular lips of a first labyrinth seal. In an aspect, the pin may include a cylindrical wall which is complementary to the coupling portion, and a radial wall which may include or carry a first downstream oriented cylindrical edge and delimiting an annular space configured to receive oil from at least one nozzle. In an aspect, the radial wall may have a series of orifices passing through the bottom of this space to allow oil to pass from downstream to upstream of the radial wall, within a lubrication enclosure of at least one bearing. In an aspect, the radial wall may include or carry a second upstream oriented cylindrical edge defining an annular space configured to receive oil exiting from the orifices and to supply this oil axially upstream. In some embodiments, the at least one bearing may include an inner ring comprising or carrying a third downstream oriented cylindrical edge and at least partially surrounding the second edge, and delimiting an annular space configured for receiving oil supplied by the second edge. The inner ring may include channels for circulating this oil to rolling elements of the at least one bearing. The radial wall may include or carry a third upstream oriented cylindrical edge with outer annular lips of a second labyrinth seal. These lips may cooperate with a layer of abradable material carried by an outer ring of the at least one bearing.

Finally, it is also described an aircraft turbomachine that includes a system for fixing a shaft of a counter-rotating turbine as described above.

DESCRIPTION OF THE DRAWINGS

The disclosure shall be better understood and other details, characteristics and advantages of the disclosure shall appear more clearly when reading the following description by way of non-limiting example and with reference to the annexed drawings in which:

FIGS. 3 to 9 are similar views to that of FIG. 1 and illustrate steps in a disassembly method according to embodiments of the disclosure, FIGS. 4a, 7a, 8a and 9a are similar views to that of FIG. 1a as part of the method steps.

DETAILED DESCRIPTION

Figure 1:
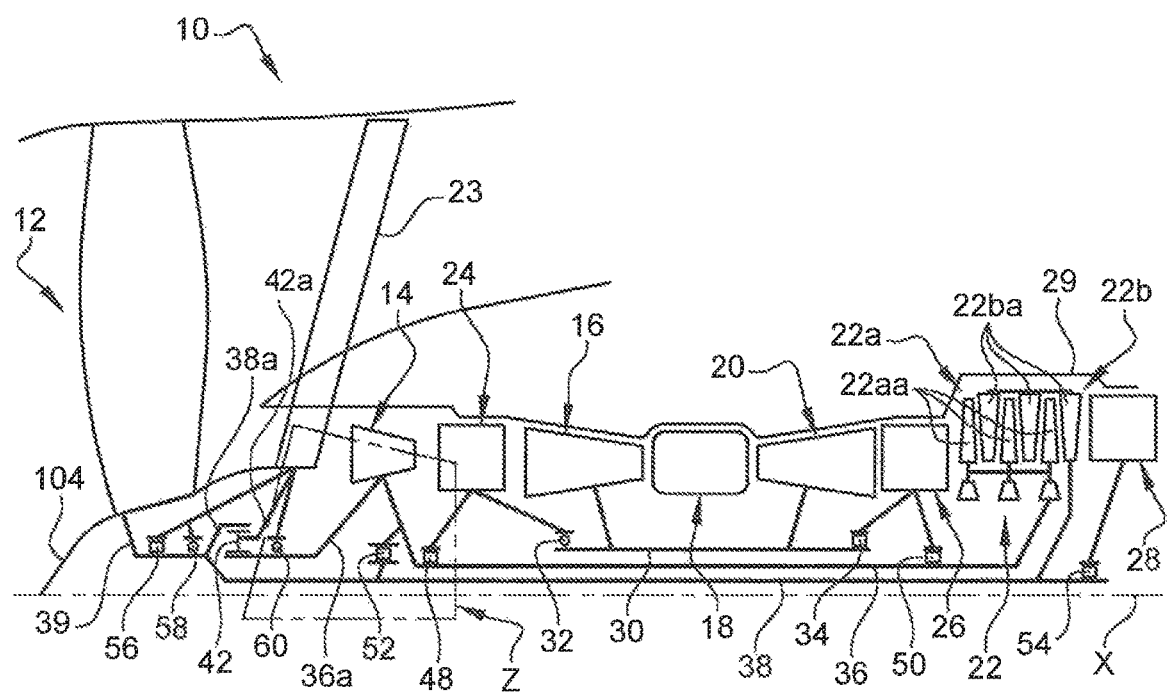
FIG. 1 is a schematic axial cross-sectional view of a turbomachine with reducer and counter-rotating turbine according to an embodiment of the disclosure.

FIG. 1 shows a very schematic representation of a turbomachine 10 with counter-rotating turbine and reducer for an aircraft.

This turbomachine 10 includes, from upstream to downstream, in the direction of flow of gases, a fan 12, a low-pressure compressor 14, a high-pressure compressor 16, an annular combustion chamber 18, a high-pressure turbine 20 and a counter-rotating turbine 22.

The reference 23 refers to an input casing located between the fan 12 and the compressor 14. The reference 24 refers to an intermediate casing located between the compressors 14 and 16, and the reference 26 refers to a turbine casing (TVF type) located between the turbines 20 and 22. Finally, the reference 28 refers to an exhaust casing (TRF type).

The rotor of the high-pressure turbine 20 drives the rotor of the high-pressure compressor 16 in rotation by a high-pressure shaft 30 which is centered and guided in rotation by bearings, such as an upstream ball bearing 32 and a downstream roller bearing 34. The bearing 32 is mounted between an upstream end of the shaft 30 and the intermediate casing 24, and the bearing 34 is mounted between a downstream end of the shaft 30 and the turbine casing 26.

The counter-rotating turbine 22 comprises a first rotor 22a, the wheels 22aa of which are configured to rotate in a first direction of rotation and are connected to a first turbine shaft 36, and a second rotor 22b, the wheels 22ba of which are configured to rotate in an opposite direction of rotation and are connected to a second turbine shaft 38. The wheels 22ba are interposed between the wheels 22aa.

The first and second rotors 22a, 22b are surrounded by a casing 29 the downstream end of which includes a flange for fixing to the exhaust casing 28.

The first shaft 36 extends axially inside the shaft 30 and drives the rotor of the low-pressure compressor 14 in rotation. This first shaft 36 is also coupled to an input shaft 36a which is engaged with a solar or planetary mechanical reducer 42 with an epicyclic gear train. The input shaft 36a is thus integral in rotation with the shaft 36.

The second shaft 38 extends axially inside the shaft 36 and drives the fan 12 in rotation. This shaft 38 is coupled to a fan casing 39 as well as an output shaft 38a which is engaged with the ring of the reducer 42.

The reducer 42 also includes satellites engaged respectively with the solar and the ring and carried by a satellite carrier 42a which is fixed to the input casing 23.

The first shaft 36 is centered and guided upstream by a bearing 48 mounted between the first shaft 36 and the intermediate casing 24, and downstream by a bearing 50 shown between the first shaft 36 and the turbine casing 26.

The second shaft 38 is centered and guided upstream by a bearing 52 mounted between the second shaft 38 and the first shaft 36, and downstream by a bearing 54 shown between the second shaft 38 and the exhaust casing 28.

The bearings 50 and 54 are roller bearings in the example shown.

The fan shaft 39 and the output shaft 38a are guided by an upstream roller bearing 56 and a downstream ball bearing 58. These bearings 56, 58 are located upstream of the reducer 42, between the fan 39 and output 38a shafts, on the one hand, and the input casing 23, on the other hand. Downstream of the reducer 42, a bearing 60 guides the input shaft 36a in rotation and is mounted between this shaft and the input casing 23.

Figure 1A:
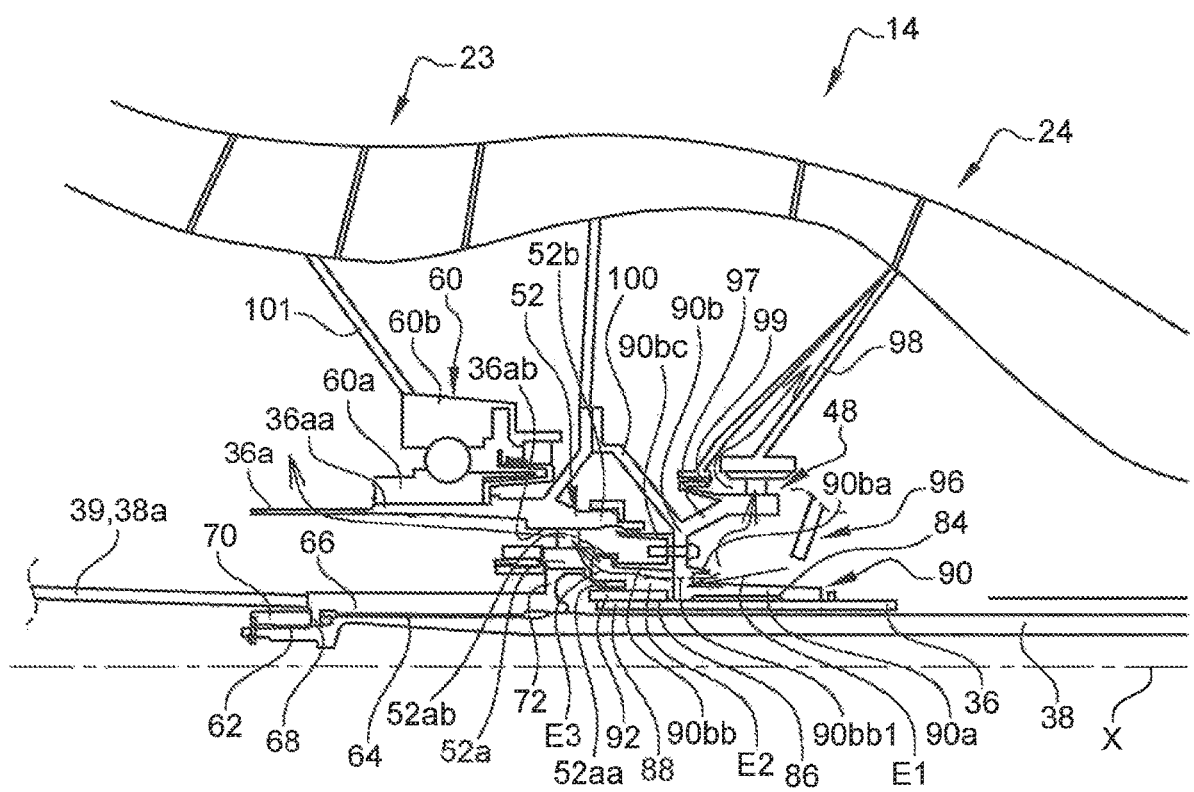
FIG. 1a is a schematic axial cross-sectional view in a larger scale and more detailed of a part of the exemplary turbomachine in FIG. 1, FIGS. 2a and 2b are schematic axial cross-sectional views and on a larger scale of a fixing system according to an embodiment of the disclosure.

FIG. 1a is a larger and more detailed view of the area Z of FIG. 1 and provides a better view of the bearings 48, 52 and 60 and their respective positions.

The second shaft 38 comprises at an upstream end an upstream screwing portion 62 with outer thread and a downstream coupling portion 64 with outer straight splines.

The fan shaft 39 and output shaft 38a are fixed to each other or formed in one piece and comprise of a downstream end that comprises of a downstream coupling portion 66 with inner straight spline. The portions 64, 66 are configured to cooperate together by complementarity of shapes in order to secure the shafts 38a, 39 and 38 in rotation.

This downstream end of the fan 39 and output 38a shafts comprises an annular edge 68 oriented radially inward and intended to be clamped axially (directly or indirectly) against a cylindrical shoulder of the shaft 38, by means of a nut 70 with inner thread screwed on the portion 62 from upstream. This nut 70 is called "second" nut because it is attached to the second shaft 38.

The portion 66 further comprises a downstream wall 72 extending radially outward and carrying on its outer periphery an inner ring 52a of the roller bearing 52.

Figure 2A:
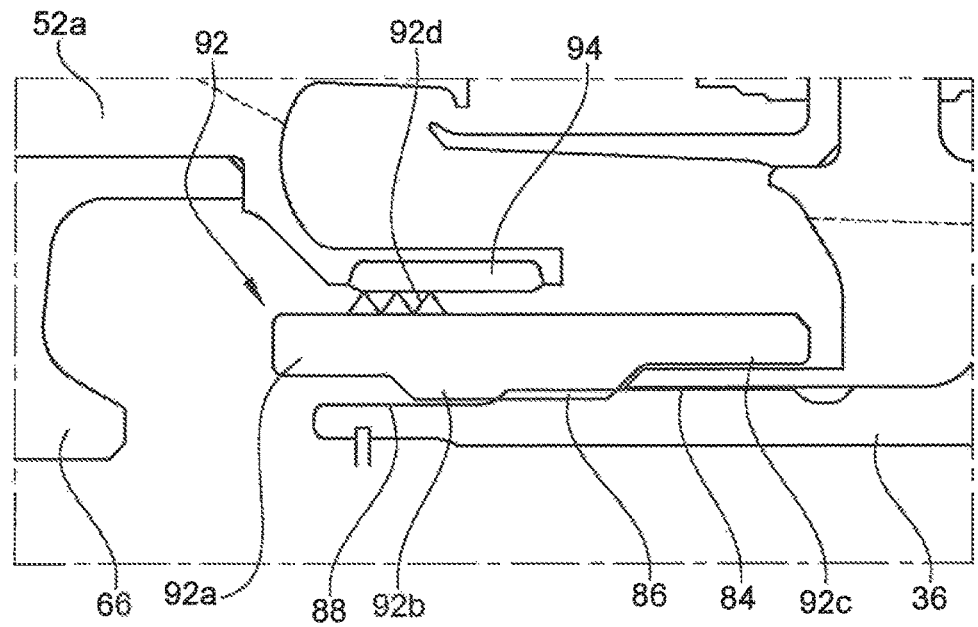
Figure 2B:
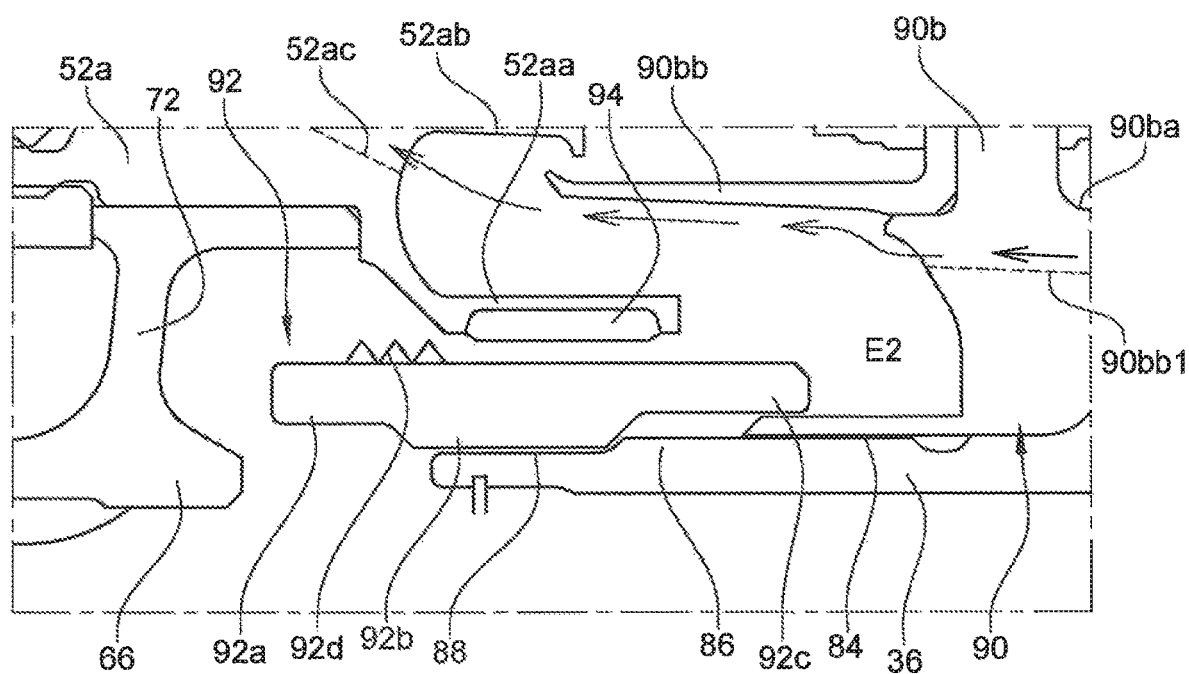

The first shaft 36 comprises an upstream end which includes a downstream coupling portion 84 with outer straight splines, a screwing intermediate portion 86 with outer thread, and a substantially cylindrical upstream retaining portion 88, these portions 84, 86, 88 being better visible in FIGS. 2a and 2b.

A pin 90 of the low-pressure compressor 14 is mounted on the upstream end of the first shaft 36 and comprises inner straight splines configured to cooperate with the coupling portion 84 to be rotationally integral with the first shaft 36.

A nut 92 for blocking the pin 90 called "first" nut because it is attached to the first shaft 36, comprises an upstream gripping section 92a configured to be engaged with a screwing/unscrewing tool of the nut, a screwing intermediate section 92b with inner thread configured to cooperate with the intermediate portion 86, and a downstream retaining section 92c which is here substantially cylindrical (FIGS. 2a and 2b).

FIG. 2a shows the nut 92 in its screwed and tightened position for blocking the pin 90. The nut 92 is supported axially on the pin 90 and fixes it axially on the shaft 36. FIG. 2b shows the nut 92 in its fully unscrewed position, when the threads of the nut and portion 86 are not engaged with each other. In this position, the nut 92 is retained radially by supporting its downstream section 92c on the pin 90 and/or the first shaft 36. In the example shown, the nut 92 is further retained radially by supporting its section 92b on the portion 88 of the shaft 36.

The nut 92 comprises outer ring lips 92d from a first labyrinth seal. In the clamping position of FIG. 2a, the lips 92d are surrounded by an annular layer 94 of abradable material and its ability to cooperate by friction in operation with it. In the example shown, the layer 94 is supported by a cylindrical edge 52aa oriented downstream of the inner ring 52a of the bearing 52.

The pin 90 comprises a cylindrical coupling wall 90a comprising inner splines for coupling to the shaft 36, as well as a radial wall 90b which extends radially outward from the upstream end of the wall 90a and which comprises or carries a first downstream oriented cylindrical edge 90ba and internally delimiting an annular space E1 configured to receive oil from at least one nozzle 96 (FIG. 1a).

The radial wall 90b has a series of orifices 90bb1 passing through the bottom of this space E1 to allow oil to pass from downstream to upstream, inside a lubrication enclosure of the bearing 52.

The orifices 90bb1 open upstream into another annular space E2 which is part of the lubrication enclosure and which is internally delimited by a second cylindrical edge 90bc upstream oriented of the wall 90b, or an element attached to the wall 90b.

As is best seen in FIG. 2b, the upstream end of this edge 90bc surrounds the downstream end of the edge 52aa of the inner ring 52a and is itself surrounded by the downstream end of another downstream cylindrical edge 52ab of the inner ring 52a. The edges 52aa, 52ab define another annular space E3 between them.

The oil sprayed by the nozzle into the space E1 is intended to flow through the orifices 90bb1 to reach the space E2. This oil then flows due to centrifugal forces along the edge 90bb and then the edge 52ab into the space E3. It then reaches channels 52ac of the inner ring 52a visible in FIG. 2b, in order to join the bearings 52 and ensure their lubrication.

The first seal formed by the lips 92d and the layer 94 seals the lubrication enclosure of the bearing 52, which is further sealed by a second seal visible in FIG. 1a and provided between another cylindrical edge 90bc upstream oriented of the radial wall 90b, which extends around the edge 90bb, and an outer ring 52b of the bearing 52. This second seal includes outer annular lips carried by the edge 90bc and cooperating with a layer of abradable material carried by the outer ring 52b.

On its outer periphery, the pin 90 comprises a first annular ferrule 97 of generally frustoconical shape, flared downstream, and carrying or forming on its outer periphery an inner ring of the bearing 48, the outer ring of which is carried by or formed on the inner periphery of an annular bearing support 98 fixed to the intermediate casing 24. In addition, a labyrinth seal 99 can be provided between the ferrule 97 and the intermediate casing 24.

On its outer periphery, the pin 90 also comprises a second annular ferrule 100 of generally frustoconical shape, flared upstream, and carrying a radially outer annular flange for fixing to the rotor of the low-pressure compressor 14, on the one hand, and to the input shaft 36a of the reducer, on the other hand.

The input shaft 36a comprises a downstream end which is configured, on the one hand, to form or carry the inner ring 60a of the bearing 60, and the outer ring 52b of the bearing 52, and on the other hand, to be fixed to the pin 90, and to the above-mentioned ferrule 100. This downstream end of the shaft 36a is overthickened and may resemble a pin.

In the example shown, the input shaft 36a comprises an outer cylindrical track 36aa for mounting the inner ring 60a of the bearing 60, the outer ring of which is fixed to an annular bearing support 101 integral with the input casing 23, and an inner cylindrical track receiving or forming the outer ring 52b of the bearing 52.

FIG. 1a shows that the bearings 60, 52 and 48 are close to each other and arranged in relation to each other to optimize the dimensions of the assembly.

The bearing 60 has an average diameter greater than the average diameter of the bearing 48, which is itself greater than the average diameter of the bearing 52. The average diameter is measured at the geometric center of the rolling members of the bearing. The bearing 52 is axially interposed between the bearing 60, located upstream, and the bearing 48, located downstream.

The first nut 70 is located upstream of the bearing 60 and the second nut 92 is located between the bearings 52, 48.

Figure 3:
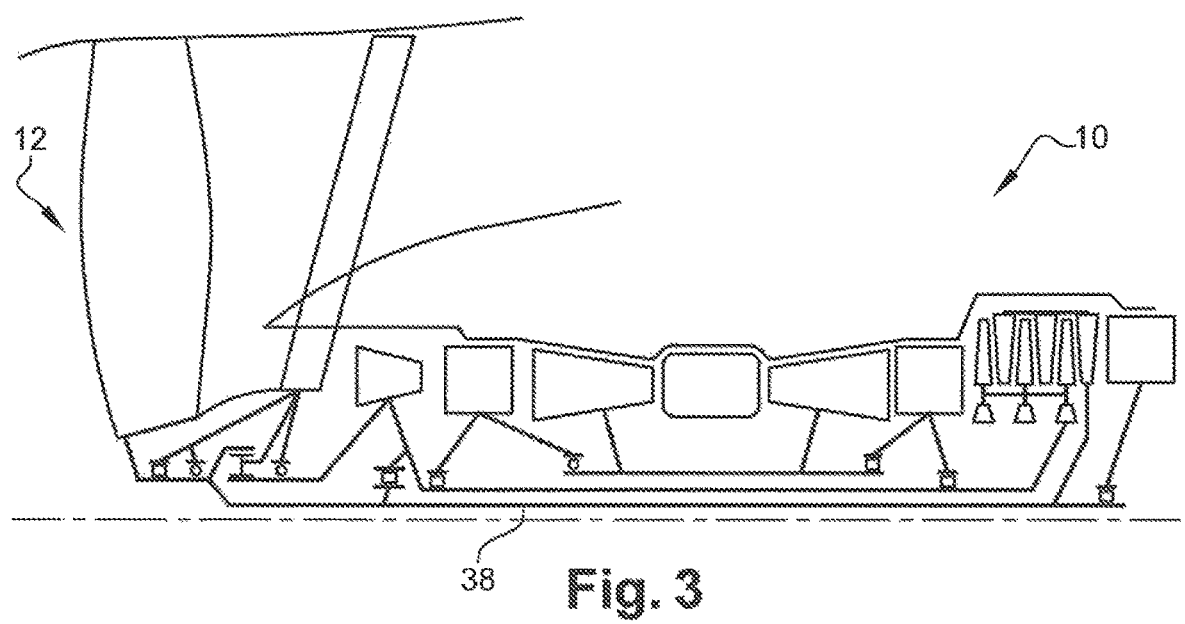

FIG. 3 and following illustrate the steps of a method according to the disclosure of disassembly of the turbomachine 10.

A first step illustrated in FIG. 3 is to remove an inlet cone 104 (visible in FIG. 1) from the turbomachine 10. This inlet cone 104 is centered on the axis of the turbomachine 10 and is fixed on the hub of the fan 12, by screws. These screws are unscrewed and the cone 104 is removed from the upstream, allowing access to the inside of the second shaft 38 and the second nut 70.

Figure 4A:
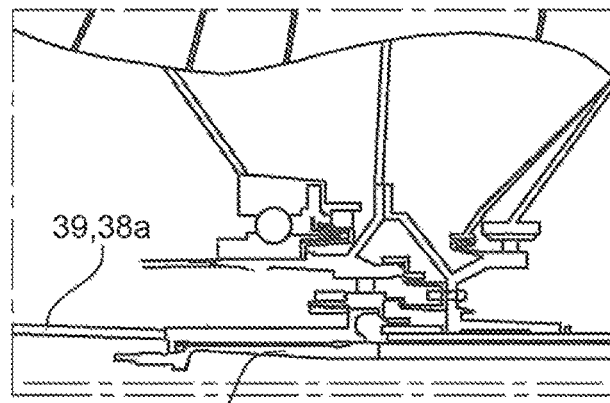
Figure 4:
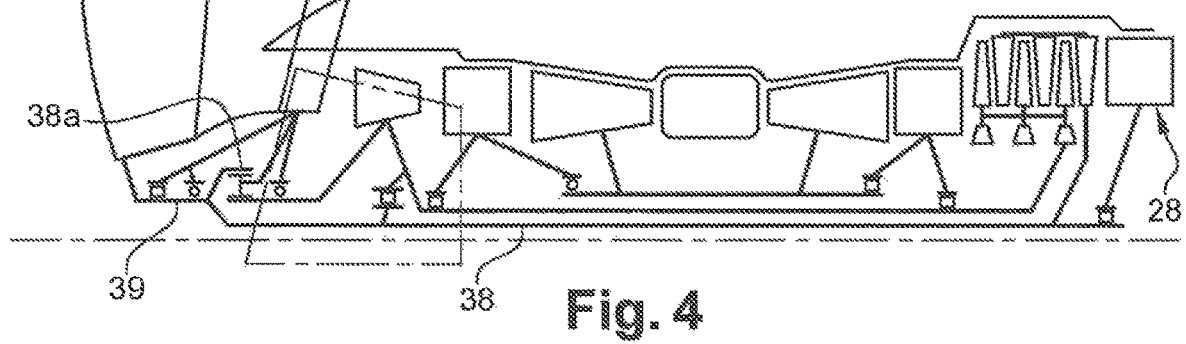

The next step illustrated in FIGS. 4 and 4a is to unscrew and remove the second nut 70. Removing this nut 70 makes it possible to separate the shaft 38, on the one hand, from the fan shaft 39 and the output shaft 38a, on the other hand, and thus to consider a removing of the shaft 38 by axial translation from the downstream part of the turbomachine.

Figure 5:
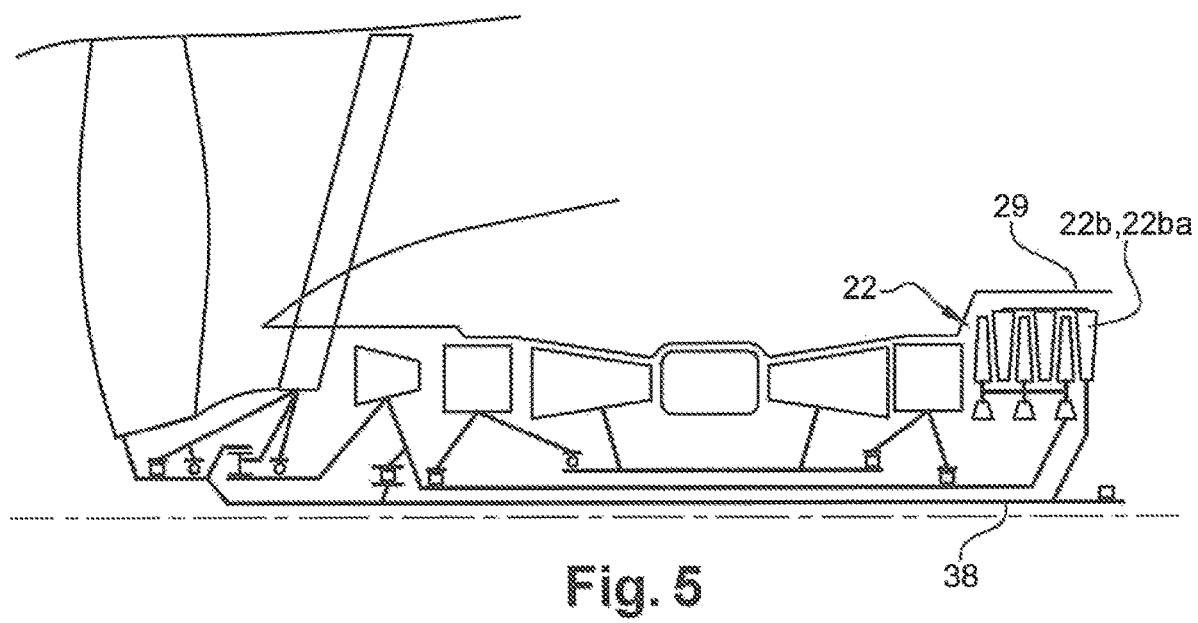

Before considering removing the shaft 38, the exhaust casing 28 is removed. The latter is therefore disconnected from the casing 29 and removed (FIG. 5).

Figure 6:
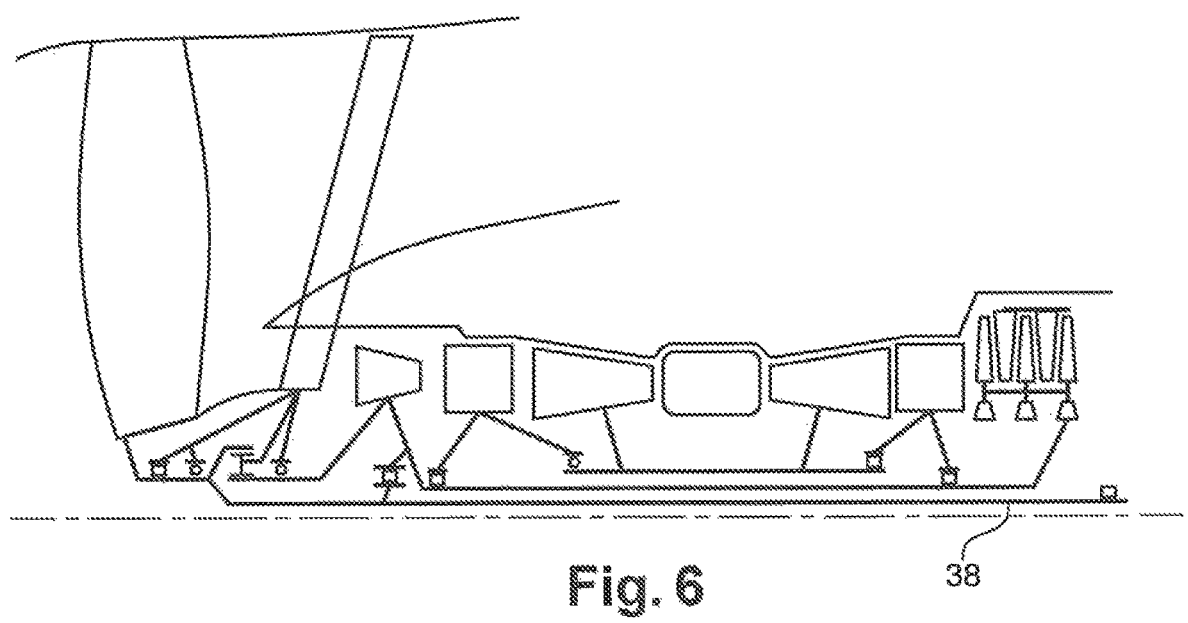

The removal of shaft 38 can be carried out at the same time as the last wheel 22ba of the rotor 22b of the turbine 22b, or independently of this wheel. This wheel 22ba is separated from the rest of the rotor 22b and then removed in FIG. 6, to allow the shaft 38 to be removed (FIGS. 7 and 7a).

Removing the shaft 38 gives access to the nut 92. This nut 92 is unscrewed and remains on the first shaft 36 due to its captive nature or trapped in a cavity during an assembly/disassembly phase. Unscrewing the nut 92 disengages the shaft 36 from the pin 90 (FIGS. 8 and 8a).

Figures 9, 9A:
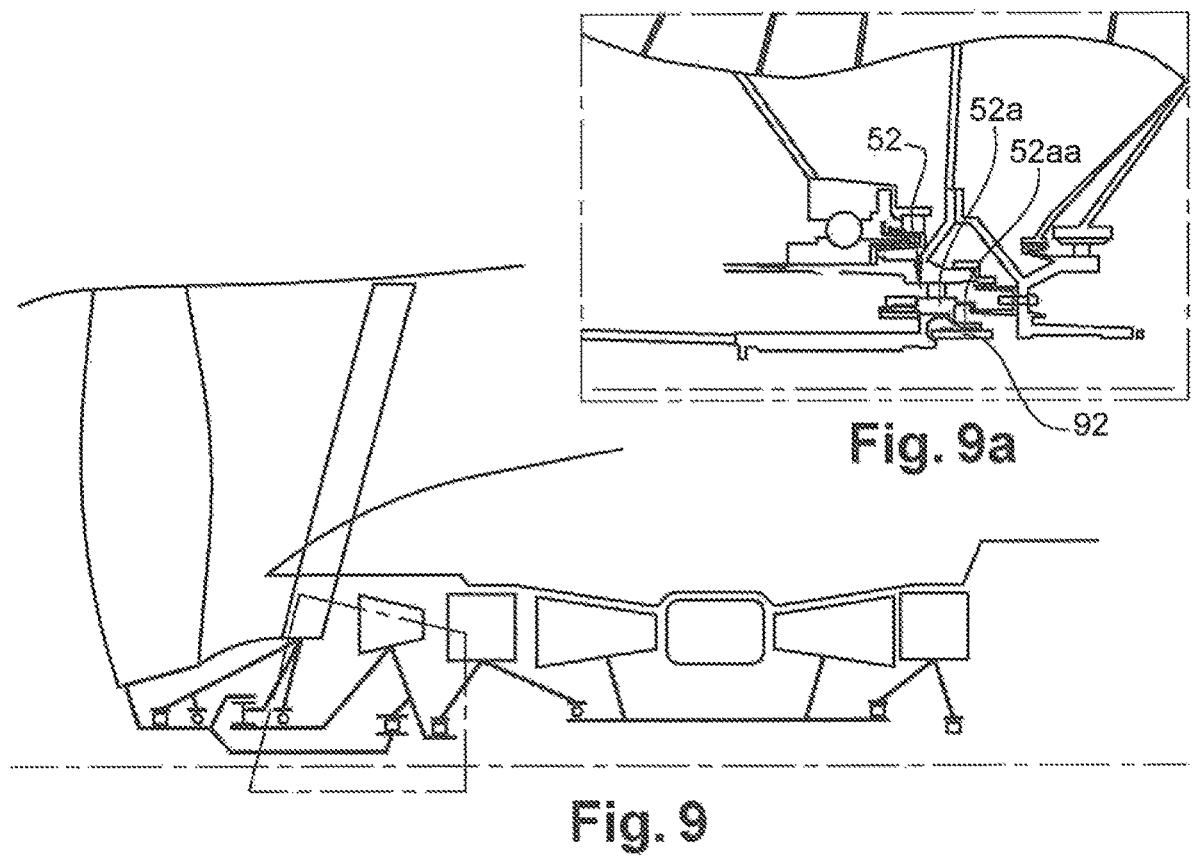

The next step is to remove the shaft 36 by axial translation from downstream of the turbomachine (FIGS. 9 and 9a). The nut 92 can then be supported radially on the cylindrical edge 52aa of the inner ring 52a of the bearing, which ensures its radial retention and ensures correct positioning of the nut for re-mounting the turbomachine 10. Alternatively, the nut 92 can also be left radially supported on the edge of the pin 90 opposite the splines 84, and the shaft 36 can still be removed.

The embodiments of the invention in which an exclusive property or privilege is claimed are defined as follows:

1. An aircraft turbomachine with a mechanical reducer and a counter-rotating turbine, comprising:
    a fan driven in rotation by a fan shaft;
    the mechanical reducer with an epicyclic gear train;
    a gas generator including the counter-rotating turbine, a first turbine shaft coupled to an input shaft of the reducer and to a pin of a low-pressure compressor of the gas generator, and a second turbine shaft coupled to the fan shaft and to an output shaft of the reducer;
    a first ball bearing located downstream of the reducer between the input shaft and an input casing, the first ball bearing guiding the input shaft of the reducer;
    a second roller bearing mounted between the pin and an intermediate casing of the turbomachine, the second roller bearing guiding the pin; and
    a third roller bearing axially interposed between the first and second bearings and radially located at an intermediate position between the first shaft and the input shaft, the third roller bearing guiding the first shaft.

2. The turbomachine according to claim 1, further comprising
    an upstream roller bearing and a downstream ball bearing, the upstream roller bearing and downstream ball bearing located upstream of the reducer, between the fan and output shafts and the input casing, the upstream roller bearing and downstream ball bearing guiding the fan shaft and the output shaft.

3. The turbomachine according to claim 1, wherein the first bearing has an average diameter greater than the average diameter of the second bearing, which is itself greater than the average diameter of the third bearing.

4. The turbomachine according to claim 1, wherein the pin is engaged on the first shaft and axially fixed thereto by a first nut screwed on the first shaft.

5. The turbomachine according to claim 4, wherein the fan shaft and the output shaft are axially fixed on the second shaft by a second nut screwed on the second shaft.

6. The turbomachine according to claim 1, wherein the first shaft is connected at a downstream end to a first rotor of the counter-rotating turbine, and the second shaft is connected at a downstream end to a second rotor of the counter-rotating turbine, the first turbine rotor comprising wheels interposed between wheels of the second turbine rotor.

7. The turbomachine according to claim 6, wherein the first and second turbine rotors are surrounded by a casing; and
    a downstream end of the casing includes a flange for fixing to an exhaust casing of the turbomachine.

8. The turbomachine according to claim 1, wherein the first turbine shaft is coupled to an input shaft of the reducer such that the first shaft is integral in rotation with the input shaft.

9. An aircraft turbomachine with a mechanical reducer and a counter-rotating turbine, comprising:
    a fan driven in rotation by a fan shaft;
    the mechanical reducer with an epicyclic gear train;
    a gas generator including the counter-rotating turbine, a first turbine shaft coupled to an input shaft of the reducer and to a pin of a low-pressure compressor of the gas generator, and a second turbine shaft coupled to the fan shaft and to an output shaft of the reducer;
    a first ball bearing located downstream of the reducer between the input shaft and an input casing, the first ball bearing guiding the input shaft of the reducer;
    a second roller bearing mounted between the pin and an intermediate casing of the turbomachine, the second roller bearing guiding the pin; and
    a third roller bearing axially interposed between the first and second bearings and radially located at an intermediate position between the first shaft and the input shaft, the third roller bearing being mounted between the second shaft and the first shaft.

10. An aircraft turbomachine with a mechanical reducer and a counter-rotating turbine, comprising:
    a fan driven in rotation by a fan shaft;
    the mechanical reducer with an epicyclic gear train;
    a gas generator including the counter-rotating turbine, a first turbine shaft coupled to an input shaft of the reducer and to a pin of a low-pressure compressor of the gas generator, and a second turbine shaft coupled to the fan shaft and to an output shaft of the reducer;
    a first ball bearing located downstream of the reducer between the input shaft and an input casing, the first ball bearing guiding the input shaft of the reducer;
    a second roller bearing mounted between the pin and an intermediate casing of the turbomachine, the second roller bearing guiding the pin; and
    a third roller bearing axially interposed between the first and second bearings and radially located at an intermediate position between the first shaft and the input shaft, the third roller bearing being located in between the second shaft and the input shaft.

* * * * *